(12) United States Patent
Tsuzaki et al.

(10) Patent No.: US 7,705,578 B2
(45) Date of Patent: Apr. 27, 2010

(54) SWITCHING REGULATOR

(75) Inventors: Toshiyuki Tsuzaki, Chiba (JP);
Michiyasu Deguchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 302 days.

(21) Appl. No.: 11/823,089

(22) Filed: Jun. 26, 2007

(65) Prior Publication Data

US 2008/0007239 A1    Jan. 10, 2008

(30) Foreign Application Priority Data

Jun. 27, 2006    (JP)    ............................. 2006-176109

(51) Int. Cl.
G05F 1/40 (2006.01)
H02M 1/12 (2006.01)

(52) U.S. Cl. ................. 323/284; 323/901; 323/908; 363/49

(58) Field of Classification Search ............ 323/277, 323/284, 901, 908, 276, 315, 351; 363/49
See application file for complete search history.

(56) References Cited

U.S. PATENT DOCUMENTS

| 6,100,678 | A  | * | 8/2000 | Hobrecht ................. 323/288 |
| 6,104,170 | A  | * | 8/2000 | Lenk et al. ............... 320/163 |
| 6,735,064 | B2 | * | 5/2004 | Miyazaki ................. 323/908 |
| 7,576,525 | B2 | * | 8/2009 | So et al. .................. 323/276 |

FOREIGN PATENT DOCUMENTS

JP    2004-297985 A    10/2004

\* cited by examiner

*Primary Examiner*—Jessica Han
(74) *Attorney, Agent, or Firm*—Brinks Hofer Gilson & Lione

(57) ABSTRACT

Provided is a switching regulator for preventing generation of an inrush current flowing through a switching element of an output stage, which is provided in the switching regulator. A soft start control circuit (116) detects a current flowing through a PMOS transistor (104) serving as a switching element of an output stage. When the detected current is equal to or larger than a current limiting value for limiting the current flowing through the PMOS transistor (104), the soft start control circuit (116) controls the PMOS transistor (104) to be turned off. Accordingly, it is possible to prevent generation of the inrush current flowing through the PMOS transistor (104).

7 Claims, 2 Drawing Sheets

SWITCHING REGULATOR

This application claims priority under 35 U.S.C. §119 to Japanese Patent Application No. JP2006-176109 filed Jun. 27, 2006, the entire content of which is hereby incorporated by reference.

BACKGROUND OF THE INVENTION

1. Field of the Invention

The present invention relates to a switching regulator having a soft start function.

2. Description of the Related Art

As a power supply unit for stably supplying a constant voltage from a power supply voltage source, a switching regulator and a series regulator are widely known. The switching regulator performs an on/off control of a switching element, which is connected in series between an input connected from the power supply voltage source and an output connected to an outside, in response to a switching pulse under a predetermined control, and performs the on/off switching of an input voltage supplied from the power supply voltage source, thereby outputting only necessary power.

The switching regulator is controlled by a switching regulator control IC. The switching regulator control IC has a soft start function for preventing an overshoot of an output voltage of the switching regulator control IC and generation of an inrush current flowing through a switching element, which are caused upon turning on of a power supply. According to the soft start function, a duty of the switching pulse with respect to the switching element upon turning on of the power supply is caused to gradually increase, thereby controlling a time period for energy transfer between the input connected from the power supply voltage source and the output connected to the outside (for example, see JP 2004-297985 A).

However, a current value between the input connected from the power supply voltage source and the output connected to the outside is not sensed. As a result, the generation of the inrush current flowing through the switching element may not be completely prevented.

SUMMARY OF THE INVENTION

The present invention has been made in view of the above-mentioned circumstances, and therefore, it is an object of the present invention to provide a switching regulator more capable of preventing generation of an inrush current flowing through a switching element.

In order to solve the above-mentioned problem, the present invention provides a switching regulator which has a soft start function, including: a switching element of an output stage; a detection circuit for detecting a current flowing through the switching element; and a control circuit for controlling the switching element to be turned off to limit the current flowing through the switching element when the current flowing through the switching element is equal to or larger than a current limiting value.

According to the present invention, the detection circuit detects the current flowing through the switching element of an output stage, and the control circuit controls the switching element to be turned off when the current thus detected is equal to or larger than the current limiting value for limiting the current flowing through the switching element. Therefore, it is possible to prevent the generation of the inrush current flowing through the switching element.

DETAILED DESCRIPTION OF THE PREFERRED EMBODIMENTS

Figure 1:
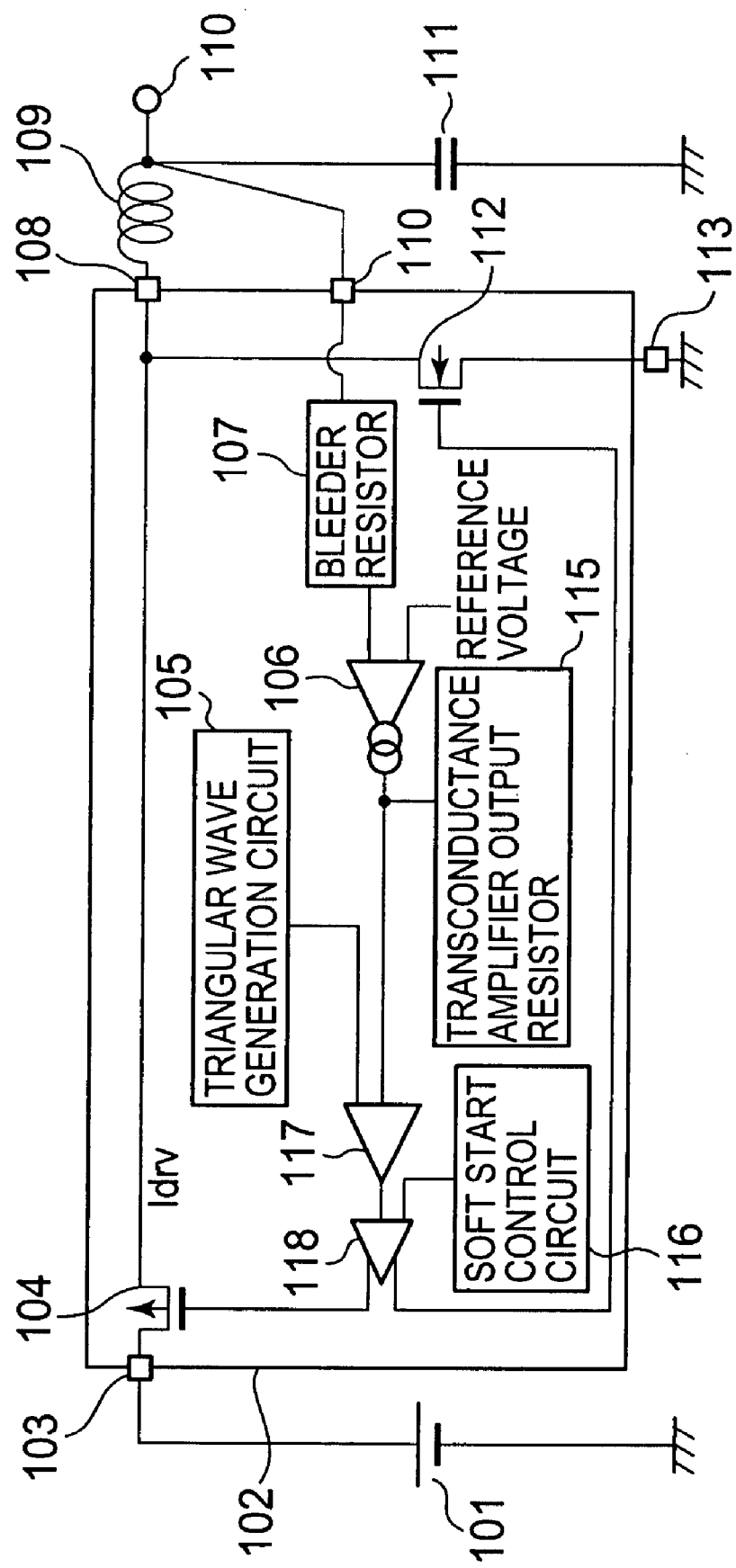
FIG. 1 is a circuit diagram schematically showing a switching regulator according to the present invention.

A switching regulator having a soft start function according to the present invention will be described below. FIG. 1 is a circuit diagram schematically showing the switching regulator.

The switching regulator includes a power supply voltage source 101, a switching regulator control IC 102 for controlling the switching regulator, a coil 109 for a smoothing circuit, and an output capacitor 111 for the smoothing circuit. The power supply voltage source 101 is connected to a power supply terminal 103 of the switching regulator control IC 102, one end of the coil 109 is connected to a control terminal 108, the other end of the coil 109 is connected to an output voltage terminal 110, and a ground terminal 113 is grounded. In addition, the output voltage terminal 110 is grounded through the output capacitor 111.

According to the switching regulator as described above, an input voltage inputted from the power supply voltage source 101 through the power supply terminal 103 is converted into a pulse-like output voltage by the switching regulator control IC 102. The pulse-like output voltage is applied to the smoothing circuit configured of the coil 109 and the output capacitor 111, and is averaged by the smoothing circuit.

Further, the switching regulator control IC 102 includes an NMOS transistor 112 of an output stage, which serves as a switching element, a PMOS transistor 104 of an output stage, a bleeder resistor 107 for dividing an output voltage of the switching regulator control IC 102, a transconductance amplifier error amplifier 106 for comparing the divided output voltage with a reference voltage and amplifying them, a transconductance amplifier output resistor 115 for taking out a comparison result as a voltage, a triangular wave generation circuit 105, a PWM comparator 117 for comparing an output voltage of the transconductance amplifier error amplifier 106 with an output voltage of the triangular wave generation circuit 105 and outputting a PWM waveform, a soft start control circuit 116, and a buffer 118.

According to the switching regulator control IC 102 as described above, the output voltage of the switching regulator control IC 102 is fed back to be further divided, and is then inputted to the transconductance amplifier error amplifier 106. The reference voltage is also inputted to the transconductance amplifier error amplifier 106. The divided output voltage and the reference voltage are compared with each other to be amplified. An amplification result and the output voltage of the triangular wave generation circuit 105 are each inputted to the PWM comparator 117 to be compared with each other. As a comparison result, a PWM waveform is outputted. The PWM waveform and the output voltage of the soft start control circuit 116 are each inputted to the buffer 118. The PWM waveform obtained through the buffer 118 is inputted to each of a gate electrode of the NMOS transistor 112 and a gate electrode of the PMOS transistor 104 under a control of the soft start control circuit 116. Based on voltage values of the gate electrodes obtained at that time, the input voltage from the power supply terminal 103 is outputted to the output voltage terminal 110 after switching is performed.

Figure 2:
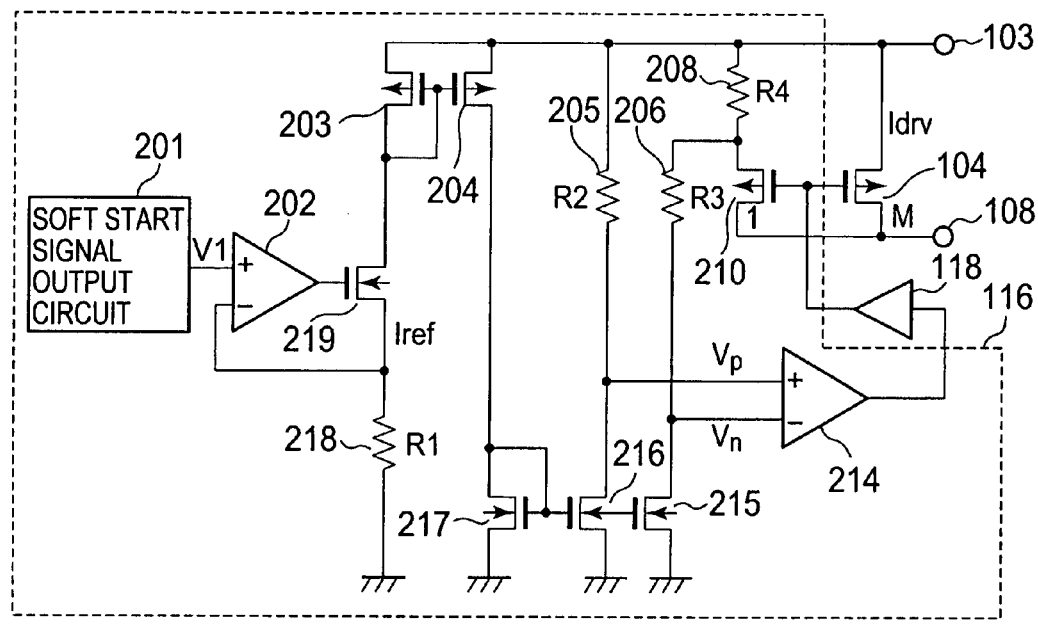
FIG. 2 is a diagram schematically showing a soft start control circuit according to the present invention.

Next, the soft start control circuit 116 will be described. FIG. 2 is a diagram schematically showing the soft start control circuit 116.

The soft start control circuit 116 includes a soft start signal output circuit 201 for outputting a signal for achieving the soft start function, a resistor 218, an operational amplifier 202 for comparing the outputted signal with a voltage of the resistor 218 and amplifying them, an NMOS transistor 219, PMOS transistors 203 and 204 each serving as a current mirror circuit, NMOS transistors 215, 216, and 217 each serving as a current mirror circuit, resistors 205, 206, and 208, a comparator 214 for comparing two predetermined voltages with each other and outputting a signal for controlling the PMOS transistor 104, and a PMOS transistor 210 serving as a current mirror circuit with the PMOS transistor 104.

It is assumed herein that a mirror ratio between the PMOS transistor 203 and the PMOS transistor 204 is 1:1, a mirror ratio between the NMOS transistor 215, the NMOS transistor 216, and the NMOS transistor 217 is 1:1:1, and a mirror ratio between the PMOS transistor 210 and the PMOS transistor 104 is 1:M.

According to the soft start control circuit 116 as described above, a voltage is outputted from the soft start signal output circuit 201, and the voltage thus outputted and a voltage generated by the resistor 218 are each inputted to the operational amplifier 202. Then, those voltages are compared with each other and amplified to be outputted, and are then inputted to a gate electrode of the NMOS transistor 219. As a result, the NMOS transistor 219 outputs a current Iref, and the current Iref flows through the resistor 218. The current Iref obtained at that time is calculated by the following formula when it is assumed that an output voltage of the soft start signal output circuit 201 is represented as V1 and a resistance value of the resistor 218 is represented as R1.

$$Iref = V1/R1 \quad (1)$$

The current Iref flows also through the resistors 205 and 206 by the current mirror circuit.

Since the mirror ratio between the PMOS transistor 210 and the PMOS transistor 104 is 1:M, a ratio between current values of a current flowing through the PMOS transistor 210 and a current Idrv flowing through the PMOS transistor 104 is also 1:M. Accordingly, a current 1/M of the current Idrv is caused to flow through the resistor 208.

Therefore, a voltage Vp at a plus terminal of the comparator 214 is calculated by the following formula when it is assumed that a power supply voltage is represented as V and a resistance value of the resistor 205 is represented as R2.

$$Vp = V - Iref \times R2 \quad (2)$$

In addition, a voltage Vn at a minus terminal of the comparator 214 is calculated by the following formula when it is assumed that a resistance value of the resistor 206 is represented as R3 and a resistance value of the resistor 208 is represented as R4.

$$Vn = V - (Iref \times R3 + (Idrv/M) \times R4) \quad (3)$$

In this case, by the comparator 214 using the PMOS transistor 210, a current flowing through the PMOS transistor 104 is detected.

In a case where the current Idrv flowing through the PMOS transistor 104 is smaller than a current limiting value Idrvlim, the resistance values of the resistors 205, 206, and 208 are set such that the comparator 214 outputs a signal of a low level. In a case where the current Idrv is equal to or larger than the current limiting value Idrvlim, the comparator 214 outputs a signal of a high level (overcurrent detection signal). The current limiting value Idrvlim obtained at that time is calculated under the following condition.

$$Vp = Vn \quad (4)$$

Further, the current limiting value Idrvlim is calculated by the following formula.

$$Idrvlim = (R2 - R3) \times M \times Iref/R4 \quad (5)$$

In a case where the current Idrv is equal to or larger than the current limiting value Idrvlim, the comparator 214 outputs a signal of a high level. The signal thus outputted is inputted to the gate electrode of the PMOS transistor 104 through the buffer 118. The PMOS transistor 104 is turned off in response to the signal.

Figure 3:
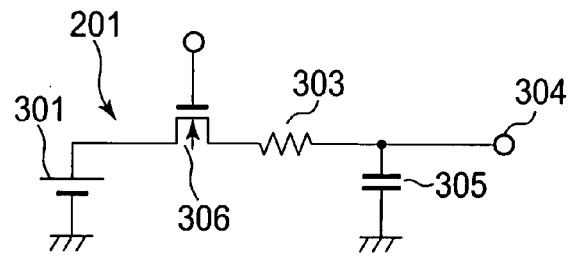
FIG. 3 is a diagram schematically showing a first soft start signal output circuit according to the present invention.

Next, the soft start signal output circuit 201 will be described. FIG. 3 is a diagram schematically showing a first soft start signal output circuit according to the present invention.

The soft start signal output circuit 201 includes a reference voltage source 301, an NMOS transistor 306, and a lowpass filter which is constituted of a resistor 303 and a capacitor 305. The reference voltage source 301 is connected to a soft start signal output terminal 304 through a channel of the NMOS transistor 306 and the lowpass filter.

According to the soft start signal output circuit 201 as described above, when the NMOS transistor 306 is turned on after turning on of the power supply, an output voltage of the soft start signal output terminal 304 is gradually changed into a voltage of the reference voltage source 301 during a time period determined based on a time constant of the lowpass filter. Therefore, according to the formulae (1) and (5), the current Iref and the current limiting value Idrvlim are also gradually changed. During the time period in which the current Iref and the current limiting value Idrvlim are changed, the soft start function is operated.

Figure 4:
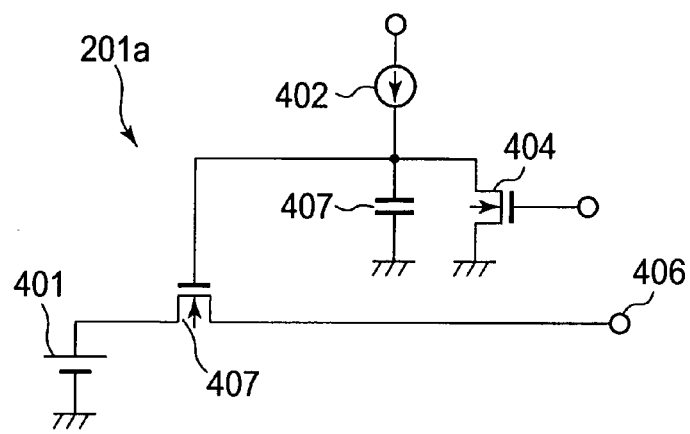
FIG. 4 is a diagram schematically showing a second soft start signal output circuit according to the present invention.

It should be noted that a configuration of the soft start signal output circuit 201 is not limited to a configuration described with reference to FIG. 3. Alternatively, a configuration described later may be adopted. FIG. 4 is a diagram schematically showing a second soft start signal output circuit according to the present invention.

A soft start signal output circuit 201a includes a reference voltage source 401, an NMOS transistor 408, a current source 402, a capacitor 407, and an NMOS transistor 404. The reference voltage source 401 is connected to a soft start signal output terminal 406 through a channel of the NMOS transistor 408. In addition, an output terminal of the current source 402 is connected to a gate electrode of the NMOS transistor 408, one end of the capacitor 407 having the other end grounded, and a drain electrode of the NMOS transistor 404 having a source electrode grounded.

According to the soft start signal output circuit 201a as described above, when the NMOS transistor 404 is turned off after turning on of the power supply, the capacitor 407 is charged by the current source 402. As a result, a gate voltage of the NMOS transistor 408 is caused to rise. According to the rise of the gate voltage, the NMOS transistor 408 is gradually turned on, and the output voltage of the soft start signal output terminal 406 is gradually changed into a voltage of the reference voltage source 401 during a time period determined based on the current source 402 and the capacitor 407.

What is claimed is:

1. A switching regulator having a soft start function, comprising:
    a switching element of an output stage;
    a detection circuit for detecting a current flowing through the switching element;
    a control circuit for controlling the switching element to be turned off to limit the current flowing through the switching element when the current flowing through the switching element is equal to or larger than a current limiting value; and
    a current limiting value control circuit that outputs a soft start signal, wherein the soft start signal is a signal that causes the current limiting value to gradually increase upon turning on of a power supply.

2. The switching regulator according to claim 1, wherein the current limiting value control circuit comprises:
    a reference voltage source;
    a soft start signal output terminal for outputting the soft start signal;
    a transistor connected between the reference voltage source and the soft start signal output terminal; and
    a lowpass filter connected between the transistor and the soft start signal output terminal.

3. The switching regulator according to claim 1, wherein the switching element comprises a PMOS transistor and the detection circuit comprises a first transistor connected with the PMOS transistor to form a first current mirror circuit.

4. The switching regulator according to claim 3, the control circuit comprising a comparator configured to compare a first predetermined voltage with a second predetermined voltage, wherein the output of the comparator is input to a gate electrode of the PMOS transistor for controlling the PMOS transistor.

5. The switching regulator according to claim 4, the detection circuit further comprising a second current mirror circuit connected to the first current mirror circuit such that the current limiting value corresponding to the switching element is a function of a reference current flowing through transistors of the second current mirror circuit, wherein a mirror ratio between the transistors of the second current mirror circuit is approximately 1:1:1.

6. The switching regulator according to claim 5, wherein the first and second predetermined voltages are a function of the reference current.

7. The switching regulator according to claim 5, wherein the soft start signal causes the reference current to gradually increase upon turning on of the power supply.

* * * * *